(12) United States Patent
Upadhyay et al.

(10) Patent No.: US 10,605,137 B2
(45) Date of Patent: Mar. 31, 2020

(54) METHODS AND SYSTEMS FOR EXHAUST CATALYST DIAGNOSTICS

(71) Applicant: Ford Global Technologies, LLC, Dearborn, MI (US)

(72) Inventors: Devesh Upadhyay, Canton, MI (US); Michael Brendan Hopka, Milford, MI (US); In Kwang Yoo, Ann Arbor, MI (US); David John Kubinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 15/476,594

(22) Filed: Mar. 31, 2017

(65) Prior Publication Data
US 2018/0283248 A1    Oct. 4, 2018

(51) Int. Cl.
*F01N 3/20* (2006.01)
*F01N 11/00* (2006.01)
(Continued)

(52) U.S. Cl.
CPC ....... *F01N 3/2066* (2013.01); *B01D 53/9418* (2013.01); *B01D 53/9431* (2013.01); *B01D 53/9495* (2013.01); *F01N 11/002* (2013.01); *F02D 41/1446* (2013.01); *B01D 2253/108* (2013.01); *B01D 2255/50* (2013.01); *B01D 2255/90* (2013.01); *B01D 2257/80* (2013.01); *F01N 2550/24* (2013.01); *F01N 2560/06* (2013.01); *F01N 2560/12* (2013.01); *F01N 2560/14* (2013.01); *F01N 2900/1622* (2013.01); *F02D 41/064* (2013.01);
(Continued)

(58) Field of Classification Search
CPC .... F01N 3/2066; F01N 11/00; F01N 2550/24; F01N 2560/06; F01N 2560/12; F01N 2560/14; F01N 2900/1622; B01D 53/9418; B01D 53/9431; B01D 53/9495; B01D 2255/50; B01D 2255/90; B01D 2253/108; B01D 2257/80; F02D 41/1446; F02D 41/064; F02D 41/1441; F02D 2200/0802; F02M 26/06; Y02T 10/24; Y02T 10/47
USPC .................. 60/274, 277, 286, 295, 299–301
See application file for complete search history.

(56) References Cited

U.S. PATENT DOCUMENTS 6,523,341 B1    2/2003  Rumpsa et al.
7,707,821 B1 *  5/2010  Legare .................... F01N 3/101
                                                          60/277
(Continued)

OTHER PUBLICATIONS

SAE Technical Paper Series (SAE S100) (Year: 2005).*
(Continued)

*Primary Examiner* — Patrick D Maines
*Assistant Examiner* — Dapinder Singh
(74) *Attorney, Agent, or Firm* — Geoffrey Brumbaugh; McCoy Russell LLP

(57) ABSTRACT

Methods and systems are provided for detecting a missing exhaust catalyst based on water adsorption and related exothermic temperature rise by the catalyst. In one example, a method may include indicating an exhaust catalyst missing in response to an estimated exhaust temperature profile being different from an expected exhaust temperature profile. The estimated exhaust temperature profile may be based on exhaust temperature upstream and downstream of the catalyst.

18 Claims, 4 Drawing Sheets

(51) Int. Cl.
  *B01D 53/94* (2006.01)
  *F02D 41/14* (2006.01)
  *F02D 41/06* (2006.01)
  *F02M 26/06* (2016.01)

(52) U.S. Cl.
  CPC .. *F02D 41/1441* (2013.01); *F02D 2200/0802* (2013.01); *F02M 26/06* (2016.02); *Y02T 10/24* (2013.01); *Y02T 10/47* (2013.01)

(56) References Cited

U.S. PATENT DOCUMENTS

| | | | |
|---|---|---|---|
| 7,886,523 B1* | 2/2011 | Legare | F02D 41/008 60/274 |
| 8,186,146 B2 | 5/2012 | Jayachandran et al. | |
| 8,863,497 B1* | 10/2014 | Legare | F02D 41/008 60/274 |
| 2010/0050608 A1* | 3/2010 | Jayachandran | F01N 11/005 60/286 |

OTHER PUBLICATIONS

Sharma, Manish, et al., "Hydrocarbon-Water Adsorption and Simulation of Catalyzed and Hydrocarbon Traps," Catalysis Today, 2016, vol. 216, pp. 82-92, 11 pages.

Hauer, A., et al., "Thermal Applications of Zeolite/Water Adsorption Processes," Proceedings of the Fifth International Conference on Fundamentals of Adsorption, 1996, pp. 369-376, 8 pages.

* cited by examiner

METHODS AND SYSTEMS FOR EXHAUST CATALYST DIAGNOSTICS

FIELD

The present description relates generally to methods and systems for detecting a missing exhaust catalyst from an exhaust system of an internal combustion engine.

BACKGROUND/SUMMARY

Vehicles may be equipped with various exhaust after-treatment devices to reduce the release of exhaust emissions into the atmosphere. For example, three-way catalysts may reduce levels of various emissions including carbon monoxide and unburnt hydrocarbons while selective catalyst reduction (SCR) devices may be used to reduce levels of NOx emissions. To ensure the after-treatment devices are functioning optimally and emissions control standards are maintained, diagnostics of the SCR device may be periodically or opportunistically carried out. Feedback from one or more exhaust system sensors may be used to determine if a SCR device is missing due to manufacturing defects or from decoupling during vehicle operations.

Various approaches are provided for carrying out diagnostics of a SCR device. In one example, as shown in U.S. Pat. No. 8,186,146, Jayachandran et al. shows measuring exhaust temperature upstream and downstream of an exhaust after-treatment device via exhaust temperature sensors. A rate of change of temperature upstream of the exhaust after-treatment device may be compared to a rate of change of temperature downstream of the exhaust after-treatment device. Due to the thermal mass of the exhaust after-treatment device, the rate of change of temperature downstream of the exhaust after-treatment device may be substantially lower than that upstream of the device. Therefore, degradation of the exhaust after-treatment device may be indicated if the upstream rate of temperature change and the downstream rate of temperature change differ by less than a predetermined amount.

However, the inventors herein have recognized potential disadvantages with the above approach. As one example, during certain engine operating conditions, operation of an exhaust after-treatment device such as the SCR device may cause a temperature exotherm thereby increasing exhaust temperature downstream of the SCR device. In the approach shown by Jayachandran et al., during conditions when there is an exothermic reaction in the SCR device, there may be erroneous indications of absence of the SCR device due the temperature downstream of the catalyst being higher than temperature upstream of the catalyst. In another approach, for SCR device diagnostics, urea may be injected upstream of the SCR device and NOx levels upstream of the SCR device may be compared to the NOx levels downstream of the SCR catalyst. However, to provide a reliable estimate of SCR device status, a significant number of readings may need to be taken over a long duration of engine operation. During low NOx loading of the SCR device, injection of urea may negatively affect emissions quality when performed over the required longer duration.

In one example, the issues described above may be addressed by a method comprising: indicating absence of an exhaust catalyst responsive to a sensed temperature profile downstream of the exhaust catalyst different from an expected temperature profile, the expected temperature profile based on water adsorption and a related exothermic temperature increase by the exhaust catalyst. In this way, by comparing exhaust temperature downstream of the exhaust catalyst to an expected temperature profile during a cold-start condition, a missing catalyst may be reliably indicated by leveraging differences in catalyst water adsorption.

As one example, exhaust after-treatment devices such as a SCR device may be a zeolite based catalyst. During cold-start conditions, water from the exhaust may be adsorbed by the zeolite layer of the SCR device. Water adsorption by zeolite is an exothermal process causing release of heat. Due to the exothermic process of water adsorption at the SCR device, exhaust temperature sensed downstream of the SCR device may be significantly higher than the exhaust temperature sensed upstream of the catalyst. By leveraging this attribute, immediately after an engine cold-start, the presence of a SCR device may be confirmed when the exhaust temperature downstream of the SCR device is higher than the exhaust temperature upstream of the SCR device. If the SCR device is missing, the zeolite may not be able to adsorb water from exhaust and the temperature downstream of the SCR device may be substantially equal to or lower than the exhaust temperature upstream of the SCR device. Further, after engine warm-up, when water from the exhaust has been removed due to evaporation or when the zeolite in the SCR device is saturated with water, the exhaust temperature downstream of the SCR device may become substantially equal to or lower than the exhaust temperature upstream of the SCR device. Once it is confirmed that the SCR device is missing, a diagnostic code may be set and further, one or more engine operating parameters such as fueling schedule, boost pressure, torque output, etc., may be adjusted in subsequent engine cycles.

In this way, by opportunistically comparing exhaust temperature sensed upstream of an exhaust catalyst such as a SCR device to exhaust temperature sensed downstream of the SCR device, absence of the SCR device may be indicated. The technical effect of using the exothermic process of water adsorption by a zeolite layer present in the SCR device during a cold-start condition is that an existing zeolite in the SCR device may be successfully utilized for on-board detection of a missing SCR device. By adjusting engine operating parameters in response to the detection of a missing catalyst, compliance to emissions standards may be maintained until the SCR device is reinstated. Overall, by detecting a missing exhaust after-treatment device and then adjusting engine operating conditions, emissions quality, and fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
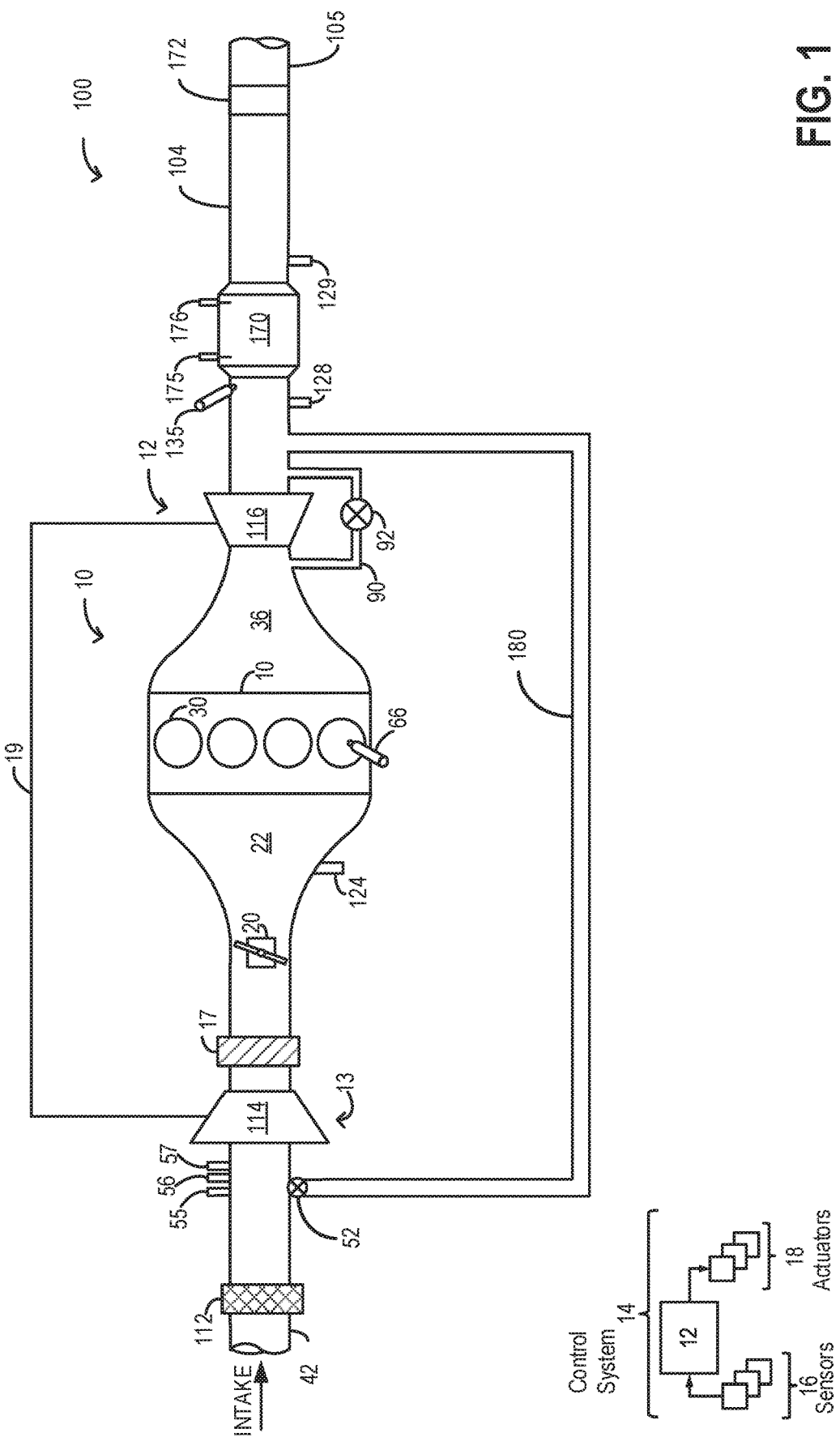
FIG. 1 shows an example embodiment of an engine system including a selective catalyst reduction (SCR) device coupled to the exhaust passage.

The following description relates to systems and methods for detection of a missing exhaust catalyst during cold-start conditions. An example engine system comprising a SCR device is shown in FIG. 1. An engine controller may be configured to perform a control routine, such as the example routine of FIG. 2, to detect a missing SCR device based on thermal changes that occur during water adoption by a zeolite layer of the SCR device. Example water adsorption based exhaust temperature profiles sensed upstream and downstream of the SCR device based on water adsorption by the SCR device are shown in FIG. 3. An example diagnostics of the SCR device is discussed with relation to FIG. 4.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake air compressor, such as a motor-driven or driveshaft-driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, for boost control and/or to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through an exhaust after-treatment catalyst 170. One or more exhaust catalysts 170 may be configured to catalytically treat the exhaust flow, and thereby reduce an amount of one or more substances in the exhaust flow. For example, the catalyst 170 may be a selective catalyst reduction (SCR) device configured to disproportionate NO, or to selectively reduce NO, with the aid of a reducing agent such as ammonia or urea added to the exhaust via injector 135. The SCR device may comprise a substrate such as zeolite that may adsorb water from exhaust flowing through it. A first exhaust gas temperature sensor 128 may be coupled to the exhaust passage 104 upstream of the SCR device 170. A second exhaust gas temperature sensor 129 may be coupled to the exhaust passage 104 downstream of the SCR device 170. In addition, a first coaxial radio frequency (RF) feed probe 175 may be coupled to a first end of the SCR device 170 proximal to the turbine 116 and a second coaxial RF feed probe 176 may be coupled to a second end of the SCR device 170 proximal to the tailpipe 105. The RF feed probes may be configured to measure a level of ammonia stored in the SCR device 170.

The SCR device 170 may be opportunistically diagnosed during engine cold-start conditions to determine if the device is missing. The SCR device 170 may be missing due to a manufacturing defect during vehicle assembly or due to the device being dislodged during operation or handling. An SCR device 170 may be indicated to be missing if an estimated exhaust temperature profile downstream of the SCR device 170 (estimated via second exhaust gas temperature sensor 129) is different from an expected exhaust temperature profile downstream of the SCR device 170. The expected temperature profile during the cold-start includes an increase in exhaust temperature sensed downstream of the SCR device 170 relative to exhaust temperature sensed upstream of the SCR device 170 for a threshold duration (time), immediately after engine-start and then after the threshold duration, a decrease in exhaust temperature downstream of the SCR device relative to exhaust temperature upstream of the SCR device. When a SCR device is present (not missing), due to an exothermic effect of water adsorption by the zeolite present in the device, the exhaust temperature downstream of the SCR device is expected to increase relative to the exhaust temperature upstream of the SCR device. After the threshold duration, the zeolite in the SCR device may be saturated with moisture and may not be able to further adsorb water thereby reducing the exothermic process. Also, as the engine temperature increases, the water in the exhaust passage may evaporate and the exothermic water adsorption process may no longer take place. The threshold duration may be based on each of an ambient humidity and an engine temperature, the threshold duration increasing as one or both of the ambient humidity increases and the engine temperature decreases and the threshold time duration decreasing as one or both of the ambient humidity decreases and the engine temperature increases. Also, the threshold duration may be based on a water content of the zeolite layer relative to a saturation level of the zeolite layer, the threshold duration decreasing with an increase in the water content of the zeolite layer. As such, the detection of the missing SCR device may be carried out within each of a threshold distance of travel immediately after engine cold-start and a threshold number of engine cycles following a first cycle immediately after cold-start. In response to a confirmation of a missing SCR device, a diagnostics code may be set and one or more engine operating parameters may be adjusted based on de-rating actions as mandated by regulatory agencies in order to improve emissions quality. In one example, an engine load may be limited to below a threshold engine load by reducing an opening of an intake throttle. In another example, fueling schedule may be adjusted for subsequent engine cycles (after the detection of the missing SCR device) by reducing pulse-width of fuel supplied during each subsequent engine cycle for a number of engine cycles. Further, upon detection of a missing SCR device, delivery of reductant to the SCR device may be stopped.

Further, the RF probes 175 and 176 may be used to measure electromagnetic resonance in the tube containing the SCR device 170. A RF signal may comprise one or more of the amplitude of energy transmitted at the resonant frequency, the frequency at which the electromagnetic resonance occurs, the width (in frequency) of the resonant peak, and the ratio of the resonant frequency to the resonant frequency width. In one example, a change (such as a drop) may be observed in the RF signal in response to water adsorption by the zeolite layer in the SCR device 170, thereby confirming the presence of a SCR device 170.

Also, an oxidation catalyst or a three-way catalyst for oxidizing residual hydrocarbons and/or carbon monoxide in the exhaust flow may be coupled to the exhaust passage 104. Different exhaust after-treatment catalysts having any of the discussed functionalities may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Oxygens sensors suitable for providing an indication of exhaust gas air-fuel ratio such as linear oxygen sensors or UEGO (universal or wide-range exhaust gas oxygen), two-state oxygen sensors or EGO, HEGO (heated EGO), a NOx, HC, or CO sensors may also be coupled to the exhaust passage 104.

All or part of the treated exhaust from catalyst 170 may be released into the atmosphere via main exhaust passage 104 after passing through a muffler 172. A low pressure exhaust gas recirculation (LP-EGR) passage 180 may route exhaust from the exhaust passage 104 (downstream of the turbine 116) to the intake passage 42 (upstream of the compressor 114). EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas temperature sensors 128 and 129, radio frequency (RF) feed probes 175 and 176, MAP sensor 124, exhaust temperature sensor, exhaust pressure sensor, compressor inlet temperature sensor 55, compressor inlet pressure sensor 56, compressor inlet humidity sensor 57, and EGR sensor. Other sensors such as additional pressure, temperature, air-fuel ratio, and composition sensors may be coupled to various locations in engine system 100. The actuators 81 may include, for example, throttle 20, EGR valve 52, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines.

For example, based on an exhaust temperature upstream of the SCR device as estimated via the first exhaust gas temperature sensor 128 and an exhaust temperature downstream of the SCR device 170 as estimated via the second exhaust gas temperature sensor 129, absence of the SCR device 170 may be determined during cold-start conditions. A plurality of engine actuators (e.g., fuel injector 66) may be adjusted based on an indication of a missing the SCR device 170. In another example, based on engine operating conditions and EGR requirements, the controller 12 may regulate the opening EGR valve 52 to draw a desired amount of EGR from the exhaust bypass passage into the engine intake manifold.

In this way, the system of FIG. 1 enable a system for an engine comprising an intake system; an exhaust system including a selective catalyst reduction (SCR) device, comprising a zeolite material, coupled to an exhaust passage, a first exhaust temperature sensor coupled to the exhaust passage upstream of the SCR device, a second exhaust temperature sensor coupled to the exhaust passage downstream of the SCR device, a turbocharger including a turbine coupled to the exhaust passage, a turbine driven compressor coupled to the intake system, and a waste-gate bypassing the turbine, and a controller with computer readable instructions stored on non-transitory memory for: during a cold-start condition, in response to a second exhaust temperature estimated via the second exhaust temperature sensor being equal to or lower than a first exhaust temperature estimated via the first exhaust temperature sensor, indicating the SCR device is missing from the exhaust passage, and in response to the second exhaust temperature being higher than the first exhaust temperature indicating the SCR device not missing.

Figure 2:
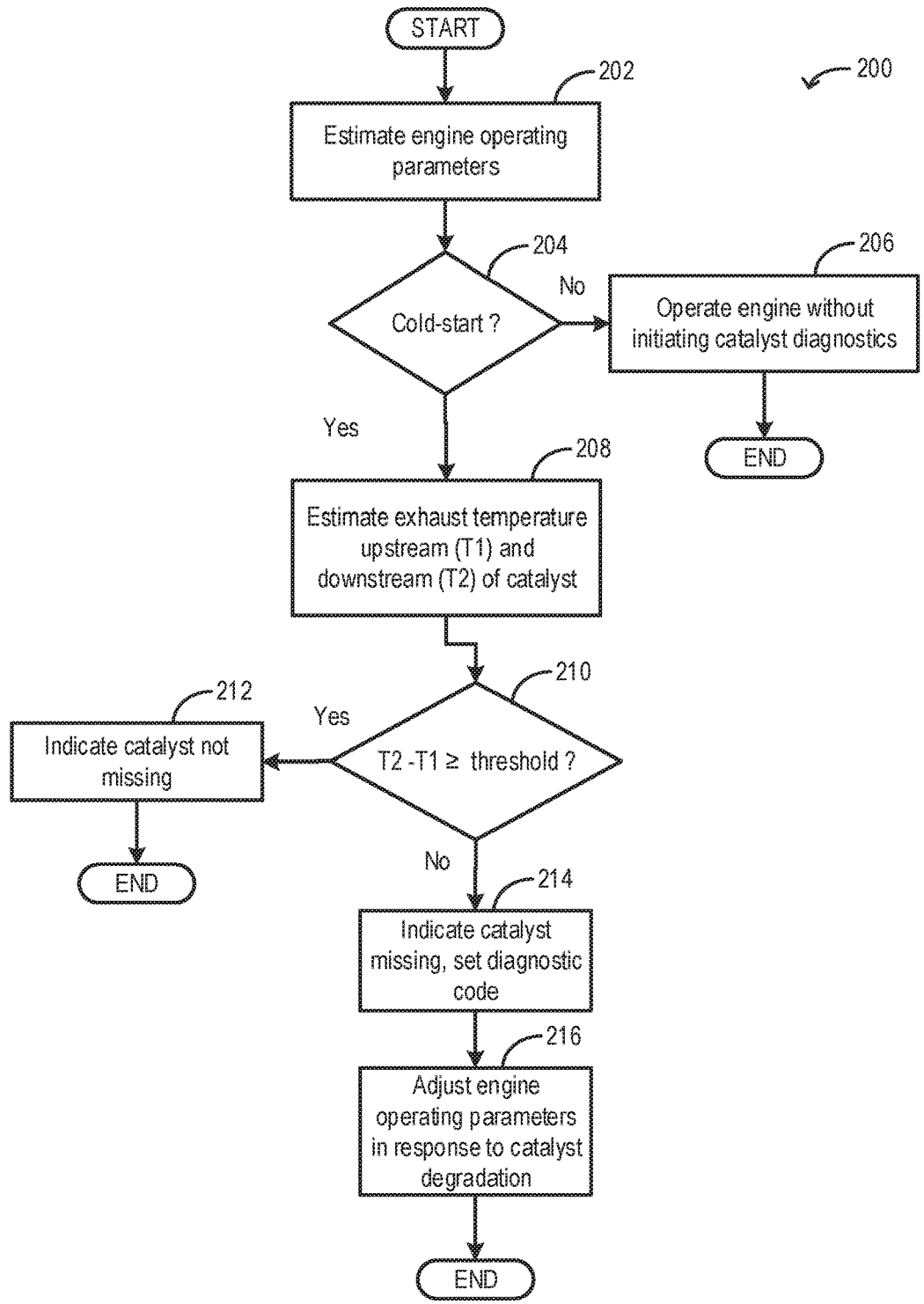
FIG. 2 shows a flow chart illustrating an example method that may be implemented for detection of a missing SCR device.
Figure 3:
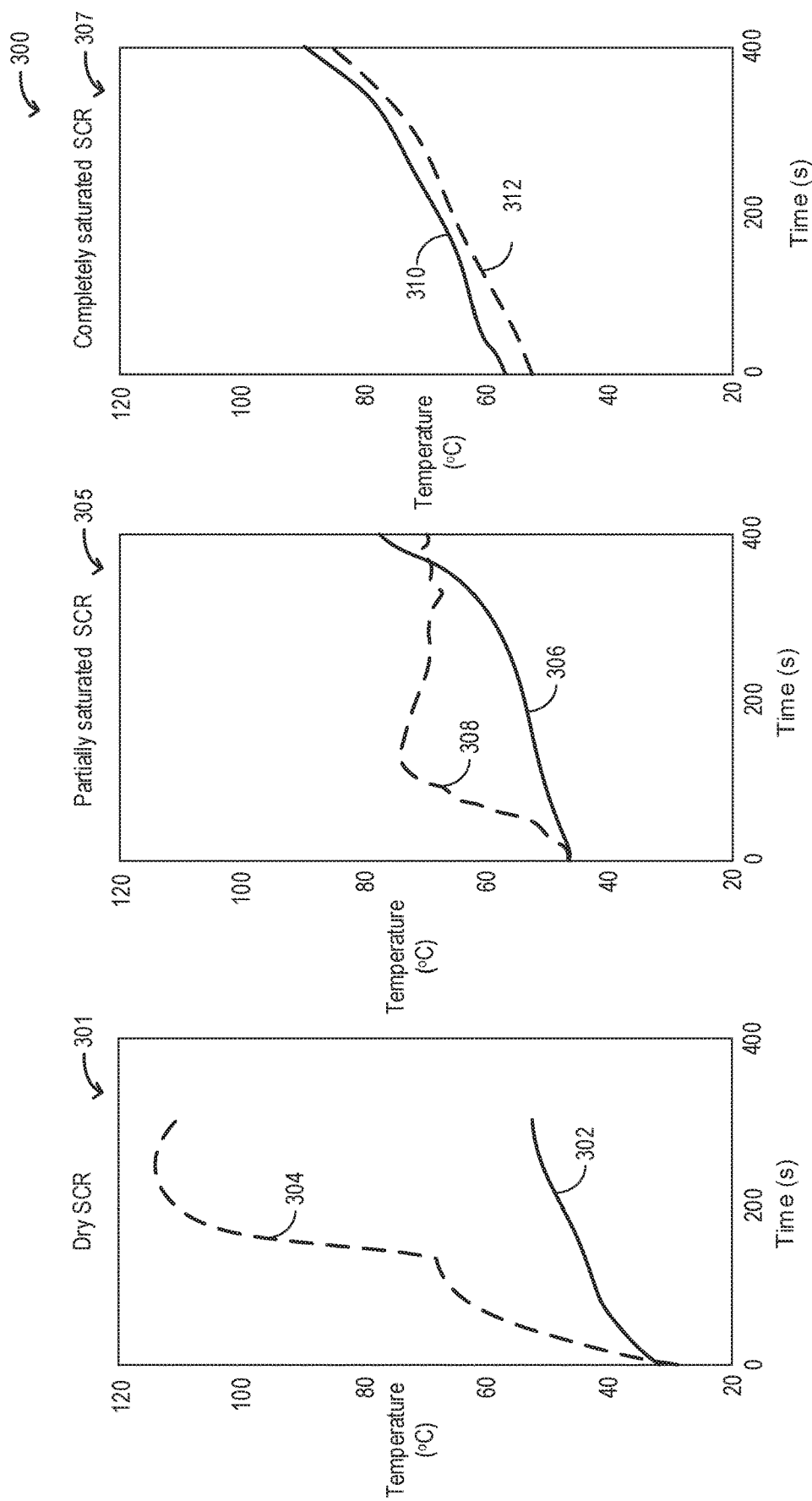
FIG. 3 shows example plots of exhaust temperature upstream and downstream of the SCR device based on a saturation level of the SCR device.

FIG. 2 illustrates an example method 200 that may be implemented for detection of a missing selective catalyst reduction (SCR) device coupled to the engine exhaust passage as shown in FIG. 1. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring engine operating conditions. Conditions assessed may include, for example, engine temperature, engine load, driver torque demand, engine speed, throttle position, exhaust pressure, exhaust air-fuel-ratio, ambient conditions including ambient temperature, pressure, and humidity, MAP, MAF, boost, etc.

At 204, the routine includes determining if the vehicle engine is operating under cold-start conditions. An engine cold-start condition may be confirmed when the engine is started after a prolonged period of engine inactivity, when the engine temperature is lower than a threshold (such as below an exhaust SCR device light-off temperature), and while ambient temperatures are below a threshold. Diagnostics of the SCR device may be carried out during cold-start conditions based on water adsorption by a zeolite material present in the SCR device.

If engine cold-start conditions are not confirmed, the routine moves to 206 and engine operation may be continued without initiation of SCR device diagnostics. If the engine is not operating under cold-start conditions, water in the exhaust may evaporate and diagnostics of the SCR device based on its water adsorption properties may not be effectively carried out. In one example, even upon confirmation that a cold-start condition is not prevalent, diagnostics of the SCR device may be initiated in response to a higher than threshold ambient humidity condition. When the ambient humidity is higher than a threshold, even during higher engine temperatures, water may be present in the exhaust passage and diagnostics of the SCR device may be carried out based on the effects of water adsorption by the zeolite present in the SCR device. During such higher than threshold humidity conditions, even when a cold-start condition is not confirmed, the routine may proceed to step 208 to detect if the SCR device is missing.

If engine cold-start conditions are confirmed, at 208, a first exhaust temperature (T1) upstream of the SCR device may be estimated based on inputs from a first exhaust gas temperature sensor (such as sensor 128 in FIG. 1) coupled to the exhaust passage upstream of the SCR device and a second exhaust temperature (T2) downstream of the SCR device may be estimated based on inputs from a second exhaust gas temperature sensor (such as sensor 129 in FIG. 1) coupled to the exhaust passage downstream of the SCR device. The first exhaust temperature T1 denotes the temperature of exhaust containing water, before entering the SCR device. The second exhaust temperature T2 denotes the temperature of exhaust after water has been adsorbed by the zeolite of the SCR device. Adsorption of water by the zeolite is an exothermic process and may cause a significant increase in exhaust temperature downstream of the SCR device. During operation of the SCR device, a reducing agent such as urea may be injected to the exhaust upstream of the SCR device in order to facilitate conversion of NOx. However, during cold-start condition, when the exhaust temperature upstream and downstream of the SCR device is measured, injection of the reducing agent may be suspended. Therefore, the addition of the reducing agent may be stopped during the generation of the exotherm caused by water adsorption.

At 210, the routine includes determining if the difference between the second exhaust temperature T2 and the first exhaust temperature T1 is greater than or equal to a threshold temperature difference. The threshold temperature difference may correspond to the difference in temperature between upstream of the SCR device and downstream exhaust of the SCR device caused by the exothermic process of water adsorption at the SCR device. In addition to comparing the difference between the second exhaust temperature T2 and the first exhaust temperature T1 to the threshold temperature difference, in one example, a rate of change of second exhaust temperature T2 may be compared to a threshold rate. In another example, the profile of the second exhaust temperature T2 may be compared to an expected (stored) temperature profile. In yet another example, a ratio of the second exhaust temperature T2 to the first exhaust temperature T1 may be compared to a threshold ratio. If it is determined that the difference between the second exhaust temperature T2 and the first exhaust temperature T1 is greater than or equal to the threshold, at 212, it may be confirmed that the catalyst is not missing. Further, if the rate of change of second exhaust temperature T2 is higher than the threshold rate, the profile of the second exhaust temperature T2 is substantially same as an expected (stored) temperature profile and the ratio of the second exhaust temperature T2 to the first exhaust temperature T1 is higher than the threshold ratio, it may be confirmed that the catalyst is not missing. In this way, during a cold-start condition, presence of the exhaust catalyst may be indicated in response to each of the difference between the first sensed exhaust temperature upstream of the exhaust catalyst and the second sensed exhaust temperature downstream of the exhaust catalyst being lower than the threshold temperature difference. The presence of the exhaust catalyst may be further indicated during lower than threshold engine coolant temperature, and/or during lower than threshold ambient humidity conditions.

As the water content of the zeolite increases, the capability of further water adsorption decreases and the temperature difference between the first exhaust temperature T1 and the second exhaust temperature T2 may decrease. Once the zeolite is saturated with water or when the water in the exhaust is evaporated due to engine warm-up, the first exhaust temperature T1 may become substantially equal to the second exhaust temperature T2. In one example, once there is no further water adsorption, the second exhaust temperature T2 may be lower than the first exhaust temperature T1 as exhaust temperature may drop downstream of the SCR device due to thermal mass of the SCR device. The first and second sensed exhaust temperature may be selectively sensed during a first number of engine cycles immediately after the engine start from rest. Also, detection of a missing SCR device may be carried out within a threshold time duration immediately after an engine cold-start or during a first number of engine cycles after engine cold-start such that the zeolite material is not saturated with moisture or the moisture in the exhaust passage is not evaporated due to increased engine temperature. In this way, detection of the missing catalyst may be carried out during predetermined conditions including one or more of the following temperature of the catalyst, time since start of an engine from which the exhaust gas is generated, temperature of an engine coolant, or ambient humidity.

If at 210 it is indicated that even during cold-start conditions, the difference between the second exhaust temperature T2 and the first exhaust temperature T1 is lower than the threshold, at 214, it may be indicated that the SCR device is missing. Further, if the rate of change of second exhaust temperature T2 is lower than the threshold rate, the profile of the second exhaust temperature T2 is substantially different from the expected (stored) temperature profile and the ratio of the second exhaust temperature T2 to the first exhaust temperature T1 is lower than the threshold ratio, it may be confirmed that the catalyst is missing. The SCR device may be missing due to a manufacturing issue during vehicle assembly or due to the device being decoupled and dislodged from its intended position in the exhaust passage during prior engine operations or handling. In one example, a degraded catalyst such as a SCR device that is cracked open due to an impact may be detected by monitoring the exothermic process of water adsorption by the zeolite layer of the SCR device. Absence of the SCR device may be indicated by setting a flag or a diagnostic code, or activating a malfunction indicator lamp in order to notify the vehicle operator that the catalyst is missing and needs to be replaced.

In response to the indication of a missing SCR device, at 216, the controller may adjust the operation of one or more engine actuators based on de-rating actions as mandated by regulatory agencies to adjust engine operation. As one example, in response to the indication of the missing SCR device, the controller may adjust the fueling schedule, limit an engine load (e.g., by reducing an opening of an intake throttle), limit an engine torque output, and/or reduce boost pressure (e.g., by opening a wastegate coupled to an exhaust turbine or a bypass valve coupled to an intake compressor) for a second number of engine cycles following the first number of engine cycles. Further, introduction of a reducing agent such as urea into the SCR catalyst should be suspended.

In this way, during an engine start from rest, absence of an exhaust catalyst may be indicated in response to a difference between a first sensed exhaust temperature upstream of the exhaust catalyst and a second sensed exhaust temperature downstream of the exhaust catalyst being higher than a threshold temperature difference.

FIG. 3 shows example plots 300 of exhaust temperature profiles detected upstream and downstream of the SCR device, the profiles based on a water saturation level of a zeolite layer of the SCR device. In each of the plots 301, 305, and 307, the x-axis denotes time (in seconds) while the y-axis denotes temperature (in ° C.).

The first plot 301 shows exhaust temperatures upstream and downstream of the SCR device when the SCR device is dry immediately after a cold-start. In the first plot 301, line 302 shows exhaust temperature upstream of the exhaust SCR device as estimated via a first exhaust temperature sensor coupled to the exhaust passage upstream of the SCR device and line 304 shows exhaust temperature downstream of the exhaust SCR device as estimated via a second exhaust temperature sensor coupled to the exhaust passage downstream of the SCR device. During a cold-start, initially when the SCR device is dry, it may adsorb the entire volume of water from exhaust flowing through the SCR device. Water adsorption by zeolite being an exothermic process, following the water adsorption, there may be an increase in exhaust temperature downstream of the SCR. Therefore, as seen from the lines 302 and 304, for a dry SCR device, the temperature downstream of the device is significantly higher than the temperature upstream of the device. Further, it is observed that there is a rapid increase in the temperature downstream of the device. The temperature profile illustrated by line 304 rises rapidly and is indicative of the exothermic reaction created by water adsorption.

As water adsorption continues, the zeolite may get saturated and may no longer adsorb the entire volume of water flowing through the device. The second plot 305 shows exhaust temperatures upstream and downstream of the SCR device when the SCR device is partially saturated with water. In the second plot 305, line 306 shows exhaust temperature upstream of the exhaust SCR device and line 308 shows exhaust temperature downstream of the exhaust SCR device. As the zeolite is partially saturated with water, a smaller amount of water may be further adsorbed by the SCR device. Therefore, due to a lower amount of heat released from the exothermic process of adsorbing a smaller amount of water, the difference between exhaust temperature downstream of the SCR device and exhaust temperature upstream of the SCR device may decrease relative to the difference in temperature during operation of a dry SCR device.

After adsorbing a threshold amount of water, the SCR device may be saturated with water and any further water adsorption may not take place. The third plot 307 shows exhaust temperatures upstream and downstream of the SCR device when the SCR device is completely saturated with water. In the third plot 307, line 310 shows exhaust temperature upstream of the exhaust SCR device and line 312 shows exhaust temperature downstream of the exhaust SCR device. As the SCR device is completely saturated with water and water adsorption no longer takes place at the SCR device, exothermic release of heat does not occur. Due to the thermal mass of the SCR device, the temperature of exhaust may drop as it flows through the SCR device. Therefore, in the third plot 307, we observed that the exhaust temperature downstream of the SCR device is lower than the exhaust temperature upstream of the SCR device.

In this way, the exhaust temperature upstream and downstream of the SCR device may vary based on the level of saturation of the SCR device, with the difference decreasing as the level of saturation increases. Further, based on the level of saturation of the SCR device the downstream temperature profile, and rate of change thereof, may vary. All of these approaches, or combinations thereof, may be used to identify a missing or degraded catalyst.

Figure 4:
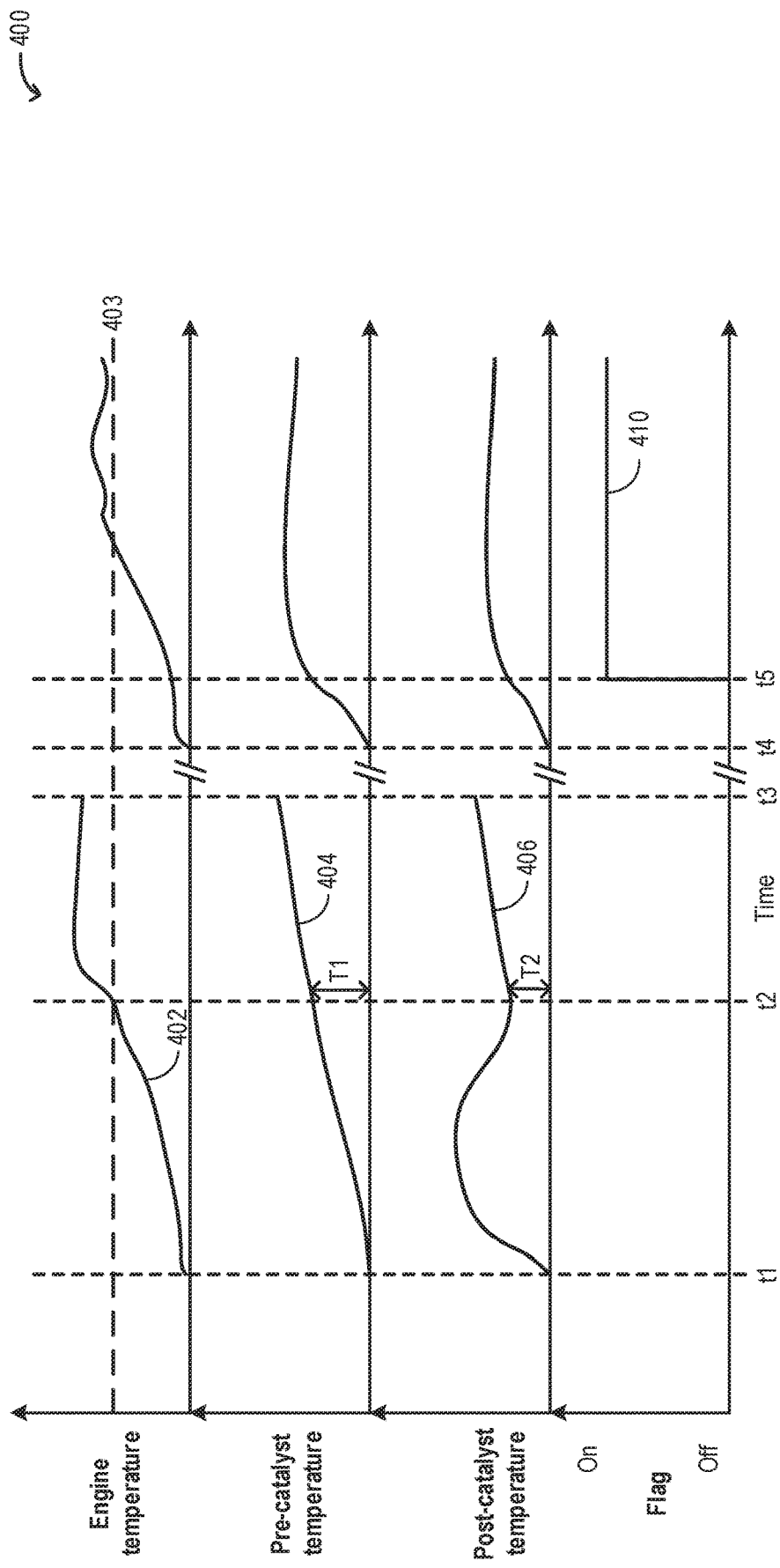
FIG. 4 shows an example diagnostics of the SCR device during cold-start conditions.

FIG. 4 shows an example operating sequence 400 illustrating diagnostics of a selective catalyst reduction (SCR) device coupled to the exhaust passage of an internal combustion engine during cold-start conditions. The horizontal (x-axis) denotes time and the vertical markers t1-t5 identify significant times in the diagnostic of the SCR device.

The first plot, line 402, shows a variation in engine temperature as estimated via an engine coolant temperature sensor, over time. Dotted line 403 denotes a threshold engine temperature below which engine cold-start conditions may be confirmed. The second plot, line 404, shows temperature of exhaust upstream of the SCR device (pre-catalyst) as estimated via a first exhaust temperature sensor coupled to the exhaust passage upstream of the SCR device. The third plot, line 406, shows temperature of exhaust downstream of the SCR device (post-catalyst) as estimated via a second exhaust temperature sensor coupled to the exhaust passage downstream of the SCR device. The fourth plot, line 410, shows a flag indicating absence of the SCR device.

Prior to time t1, the engine is shut down and the engine is not operated to propel the vehicle. During this time, the engine components including the SCR device is not operational. The zeolite in the SCR device is dry from a previous higher temperature operation of the engine. At time t1, in response to an operator torque demand, the engine starts from rest after a period of inactivity. At the time of the engine start, the engine temperature is lower than the threshold temperature 403 indicating cold-start conditions. During cold-start, due to lower engine temperature, water form combustion is not evaporated in the exhaust passage and exhaust along with the water flows through the SCR device. At the SCR device, the water is adsorbed via an exothermic process.

Between time t1 and t2, the pre-catalyst exhaust temperature increases steadily, however due to the exothermal effect of water adsorption at the SCR device, there is a spike in post-catalyst exhaust temperature. The SCR device has a threshold water adsorption capacity and is not further able to adsorb any water once it is saturated. With an increase in the amount of water adsorbed by the SCR device, further water uptake by the SCR device decreases and the exotherm causing the spike in post-catalyst exhaust temperature correspondingly decreases. In response to the spike in post-catalyst exhaust temperature caused by adsorption of water during cold-start conditions, it is inferred that the SCR device is not missing and the flag can be maintained in the "off" position.

At time t2, it is observed that the post-catalyst exhaust temperature (as denoted by T2) is lower than the pre-catalyst exhaust temperature (as denoted by T1). Based on the decrease of the post-catalyst exhaust temperature, it is inferred that the SCR device is saturated with water and further adsorption is not taking place. At time t2, the engine temperature also increases to above the threshold temperature 403 and the engine no longer operates under cold-start conditions. Between time t2 and t3, due to the thermal mass of the SCR device, the post-catalyst exhaust temperature remains lower than the pre-catalyst exhaust temperature. Also, during engine operation between time t2 and t3, due to the higher engine temperature, the water adsorbed in the SCR device evaporates, thereby drying the device.

At time t3, in response to operator request, the vehicle engine is shut-down and between time t3 and t4, the engine is not operated to propel the vehicle. At time t4, in response to an operator torque demand, the engine restarts from rest. Based on the lower than threshold engine temperature it is inferred that the engine is operating under cold-start conditions. However, between time t4 and t5, it is observed that the post-catalyst exhaust temperature remains below the pre-catalyst exhaust temperature. Based on each of the pre-catalyst and post-catalyst exhaust temperatures, it is inferred that water adsorption by the SCR device which would have caused an increase in post-catalyst exhaust temperature is not taking place. Based on the SCR device's inability to adsorb water during cold-start conditions, it is inferred that the device has been dislodged from its intended position and is missing and the flag may be turned to an "On" position to set a diagnostic code indicating the absence of the SCR device at its intended position. Also, until the SCR device has been inserted, after time t5, engine operating conditions such as fueling is adjusted to account for the degraded SCR device.

In this way, a method may comprise, reducing nitrogen oxide emissions in engine exhaust gas flowing over a substrate of a catalyst containing a catalyzing material, generating an exotherm over the substrate by adsorption of exhaust water vapor under predetermined conditions, and during a time the exotherm would be generated, indicating absence of the catalyst based on a temperature increase downstream of the catalyst, caused by the exotherm, in relation to a temperature upstream of the catalyst.

In this way, by using the exothermic water adsorption property of a zeolite included in an exhaust catalyst during cold-start and higher ambient humidity conditions, a missing catalyst may be detected. The technical effect of leveraging an existing component of the exhaust catalyst for on-board diagnostics is that a missing catalyst, decoupled and dislodged catalysts may be detected without a physical inspection of the engine. By adjusting engine operating parameters in response to the detection of a missing catalyst, emissions quality may be improved even with a missing catalyst. By timely detecting a missing exhaust after-treatment device emissions issues may be reduced by timely performing appropriate mitigating steps.

An example method comprises: indicating absence of an exhaust catalyst responsive to a sensed temperature profile downstream of the exhaust catalyst different from an expected temperature profile, the expected temperature profile based on water adsorption and a related exothermic temperature increase by the exhaust catalyst. In any preceding example, additionally or optionally, the indicating includes indicating responsive to the sensed temperature profile, sensed during an engine cold-start. In any or all of the preceding examples, additionally or optionally, the expected temperature profile includes an increase in exhaust temperature sensed downstream of the exhaust catalyst relative to exhaust temperature sensed upstream of the exhaust catalyst for a threshold time duration immediately after the engine cold-start. In any or all of the preceding examples, additionally or optionally, the expected temperature profile includes an increase in exhaust temperature sensed downstream of the exhaust catalyst relative to exhaust temperature sensed upstream of the exhaust catalyst for a threshold time duration immediately after the engine cold-start. In any or all of the preceding examples, additionally or optionally, the expected temperature profile further includes an increase in a rate of change in the exhaust temperature sensed downstream of the exhaust catalyst relative to a rate of change in the exhaust temperature sensed upstream of the exhaust catalyst for the threshold time duration immediately after the engine cold-start. In any or all of the preceding examples, additionally or optionally, the expected temperature profile further includes, after the threshold time duration, a decrease in the sensed exhaust temperature downstream of the exhaust catalyst relative to exhaust temperature sensed upstream of the exhaust catalyst. In any or all of the preceding examples, additionally or optionally, the threshold time duration is based on each of an ambient humidity and an engine temperature, the threshold time duration increased as one or both of the ambient humidity increases and the engine temperature decreases. In any or all of the preceding examples, additionally or optionally, the exhaust temperature upstream of the exhaust catalyst is measured via a first exhaust temperature sensor coupled to an exhaust passage upstream of the exhaust catalyst and the exhaust temperature downstream of the exhaust catalyst is measured via a second exhaust temperature sensor coupled to the exhaust passage downstream of the exhaust catalyst. Any or all of the preceding examples further comprises, additionally or optionally, in response the indication of the exhaust catalyst being absent, adjusting one or more engine operating parameters including limiting an engine load to below a threshold engine load by reducing an opening of an intake throttle. In any or all of the preceding examples, additionally or optionally, the exhaust catalyst is a selective catalytic reduction (SCR) device and wherein based on water adsorption is based on zeolite layer within the SCR device capable of adsorbing water from exhaust flowing via the SCR device.

Another example method comprises: during an engine start from rest, indicating absence of an exhaust catalyst in response to a difference between a first sensed exhaust temperature upstream of the exhaust catalyst and a second sensed exhaust temperature downstream of the exhaust catalyst being higher than a threshold temperature difference. In any of the preceding examples, additionally or optionally, the engine start includes an engine cold-start with a lower than threshold engine temperature. In any or all of the preceding examples, additionally or optionally, the engine start condition includes an engine start at a higher than threshold ambient humidity. In any or all of the preceding examples, additionally or optionally, the exhaust catalyst is a selective catalyst reduction (SCR) device including a zeolite layer capable of water adsorption during the engine condition. Any or all of the preceding examples further comprising, additionally or optionally, during the engine start condition, indicating presence of the exhaust catalyst in response to each of the difference between the first sensed exhaust temperature upstream of the exhaust catalyst and the second sensed exhaust temperature downstream of the exhaust catalyst being lower than the threshold temperature difference. In any or all of the preceding examples, additionally or optionally, first and second sensed exhaust temperature is selectively sensed during a first number of engine cycles immediately after the engine start from rest. Any or all of the preceding examples further comprising, additionally or optionally, in response to the indication of the absence of the exhaust catalyst, adjusting a fueling schedule for a second number of engine cycles following the first number of engine cycles, the adjusting including reducing a pulse-width of fuel supplied by a fuel injector during each of the second number of engine cycles.

In yet another example, a method comprises: reducing nitrogen oxide emissions in engine exhaust gas flowing over a substrate of a catalyst containing a catalyzing material; generating an exotherm over the substrate by adsorption of exhaust water vapor under predetermined conditions; and during a time the exotherm would be generated, indicating absence of the catalyst based on a temperature increase downstream of the catalyst, caused by the exotherm, in relation to a temperature upstream of the catalyst. In any preceding example, additionally or optionally, the downstream temperature change comprises one or more of the following: a temperature profile that changes with time; a rate of change of the downstream temperature; a difference between the downstream and upstream temperatures; or a change in a ratio of the downstream to upstream temperatures. Any or all of the preceding examples further comprising, additionally or optionally, indicating absence of the catalyst based on a temperature downstream of the catalyst being equal to or lower than a temperature upstream of the catalyst. Any or all of the preceding examples further comprising, additionally or optionally, adding a reducing agent to the catalyst, and stopping the reducing agent addition during the generation of the exotherm caused by water adsorption. In any or all of the preceding examples, additionally or optionally, the predetermined conditions are related to one or more of the following temperature of the catalyst, time since start of an engine from which the exhaust gas is generated, temperature of an engine coolant, or ambient humidity.

In a further representation, an example engine system comprises: an intake system, an exhaust system including a selective catalyst reduction (SCR) device, comprising a zeolite layer, coupled to an exhaust passage, a first exhaust temperature sensor coupled to the exhaust passage upstream of the SCR device, a second exhaust temperature sensor coupled to the exhaust passage downstream of the SCR device, a turbocharger including a turbine coupled to the exhaust passage, a turbine driven compressor coupled to the intake system, and a waste-gate bypassing the turbine, and a controller with computer readable instructions stored on non-transitory memory for: during a cold-start condition, in response to a second exhaust temperature estimated via the second exhaust temperature sensor being equal to or lower than a first exhaust temperature estimated via the first exhaust temperature sensor, indicating the SCR device is missing from the exhaust passage, and in response to the second exhaust temperature being higher than the first exhaust temperature indicating the SCR device not missing. In any or all of the preceding examples, additionally or optionally, the estimating of the first exhaust temperature, the second exhaust temperature, and the indicating of the missing SCR device is carried out within a threshold duration following the cold-start condition, the threshold duration based on a water content of the zeolite layer relative to a saturation level of the zeolite layer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware devices in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
indicating absence of an exhaust catalyst responsive to a sensed temperature profile downstream of the exhaust catalyst different from an expected temperature profile, the expected temperature profile based on water adsorption and a related exothermic temperature increase by the exhaust catalyst.

2. The method of claim 1, wherein the indicating includes indicating responsive to the sensed temperature profile, sensed during an engine cold-start.

3. The method of claim 2, wherein the expected temperature profile includes an increase in exhaust temperature sensed downstream of the exhaust catalyst relative to exhaust temperature sensed upstream of the exhaust catalyst for a threshold time duration immediately after the engine cold-start.

4. The method of claim 3, wherein the expected temperature profile further includes an increase in a rate of change in the exhaust temperature sensed downstream of the exhaust catalyst relative to a rate of change in the exhaust temperature sensed upstream of the exhaust catalyst for the threshold time duration immediately after the engine cold-start.

5. The method of claim 3, wherein the expected temperature profile further includes, after the threshold time duration, a decrease in the sensed exhaust temperature downstream of the exhaust catalyst relative to the exhaust temperature sensed upstream of the exhaust catalyst.

6. The method of claim 3, wherein the threshold time duration is based on each of an ambient humidity and an engine temperature, the threshold time duration increased as one or both of the ambient humidity increases and the engine temperature decreases.

7. The method of claim 3, wherein the exhaust temperature sensed upstream of the exhaust catalyst is measured via a first exhaust temperature sensor coupled to an exhaust passage upstream of the exhaust catalyst and the exhaust temperature sensed downstream of the exhaust catalyst is measured via a second exhaust temperature sensor coupled to an exhaust passage downstream of the exhaust catalyst.

8. The method of claim 1, further comprising, in response to the indication of the exhaust catalyst being absent, adjusting one or more engine operating parameters including limiting an engine load to below a threshold engine load by reducing an opening of an intake throttle.

9. The method of claim 1, wherein the exhaust catalyst is a selective catalytic reduction (SCR) device and wherein the expected temperature being based on water adsorption is based on a zeolite layer within the SCR device capable of adsorbing water from exhaust flowing via the SCR device; and further comprising reducing NOx emissions of engine exhaust.

10. A method, comprising:
during a start of an engine from rest, indicating absence of an exhaust catalyst coupled to an exhaust of the engine in response to a difference between a first sensed exhaust temperature upstream of the exhaust catalyst and a second sensed exhaust temperature downstream of the exhaust catalyst being higher than a threshold temperature difference,
wherein the first and second sensed exhaust temperatures are selectively sensed during a first number of engine cycles immediately after the start of the engine from rest; and
further comprising, in response to the indication of the absence of the exhaust catalyst, adjusting a fueling schedule for a second number of engine cycles following the first number of engine cycles, the adjusting including reducing a pulse-width of fuel supplied by a fuel injector during the second number of engine cycles.

11. The method of claim 10, wherein the start of the engine includes an engine cold-start with a lower than threshold engine temperature.

12. The method of claim 10, wherein the start of the engine includes an engine start at a higher than threshold ambient humidity.

13. The method of claim 10, wherein the exhaust catalyst is a selective catalyst reduction (SCR) device including a zeolite layer capable of water adsorption during the start of the engine.

14. The method of claim 10, further comprising, during the start of the engine, indicating presence of the exhaust catalyst in response to each of the difference between the first sensed exhaust temperature upstream of the exhaust catalyst and the second sensed exhaust temperature downstream of the exhaust catalyst being lower than the threshold temperature difference.

15. A method comprising:
reducing nitrogen oxide emissions in engine exhaust gas flowing over a substrate of a catalyst containing a catalyzing material;
generating an exotherm over the substrate by adsorption of exhaust water vapor under predetermined conditions; and
during a time the exotherm would be generated, indicating presence of the catalyst based on a temperature increase downstream of the catalyst, caused by the exotherm, in relation to a temperature upstream of the catalyst.

16. The method of claim 15, further comprising indicating an absence of the catalyst based on a temperature downstream of the catalyst being equal to or lower than the temperature upstream of the catalyst.

17. The method of claim 15, further comprising adding a reducing agent to the catalyst and stopping the reducing agent addition during the generation of the exotherm caused by water adsorption.

18. The method of claim 15, wherein the predetermined conditions include one or more of the following: temperature of the catalyst, time since start of an engine from which the exhaust gas is generated, temperature of an engine coolant, or ambient humidity.

* * * * *